United States Patent Office 3,085,703
Patented Apr. 16, 1963

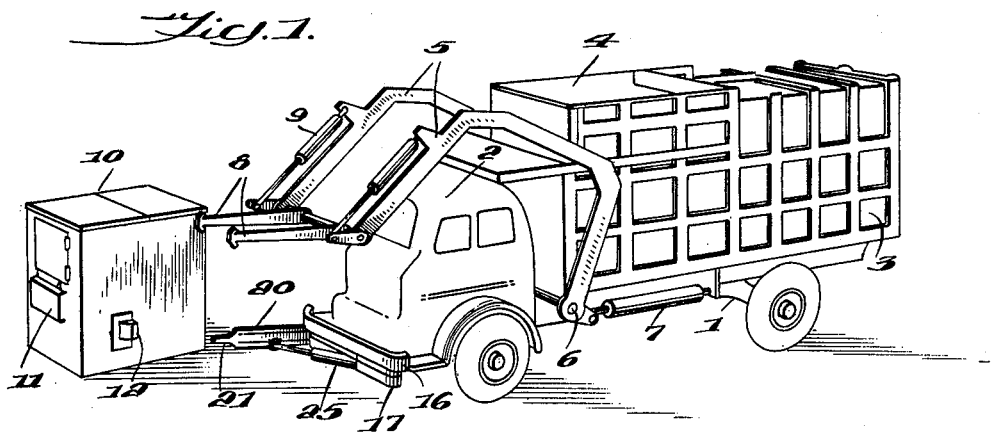
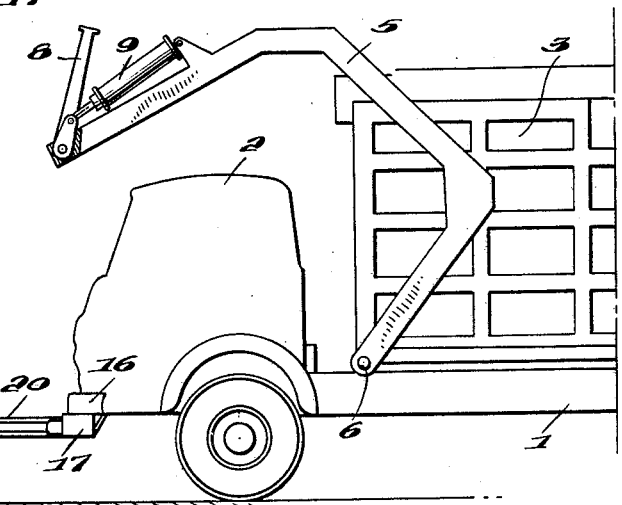
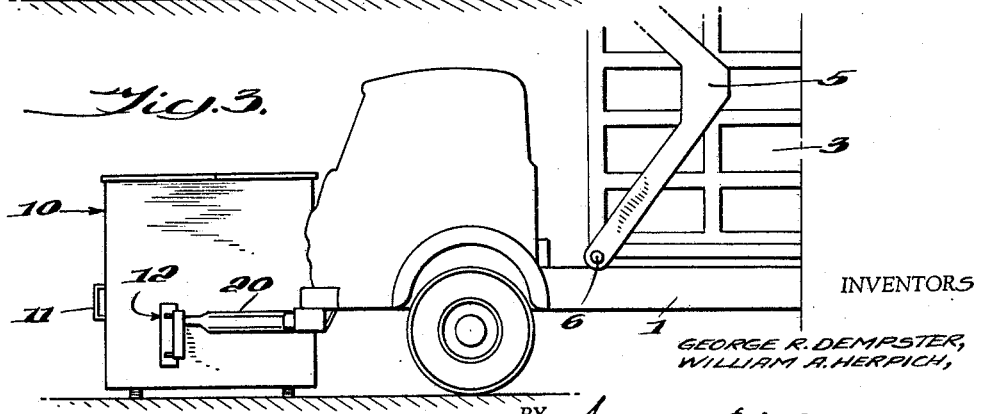
INVENTORS
GEORGE R. DEMPSTER,
WILLIAM A. HERPICH,
BY
ATTORNEYS

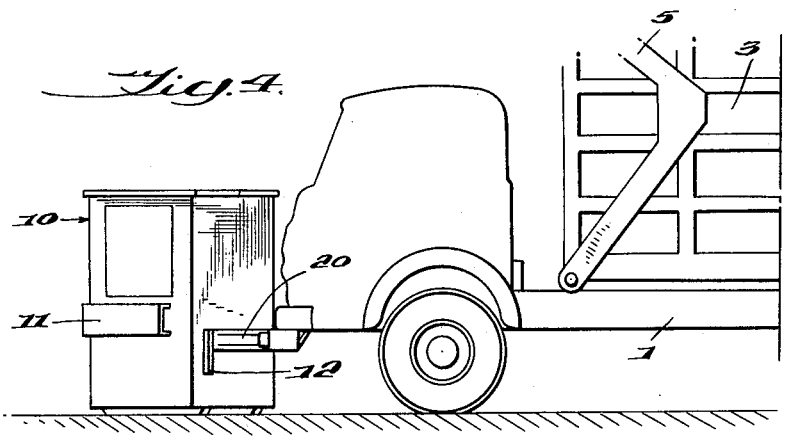
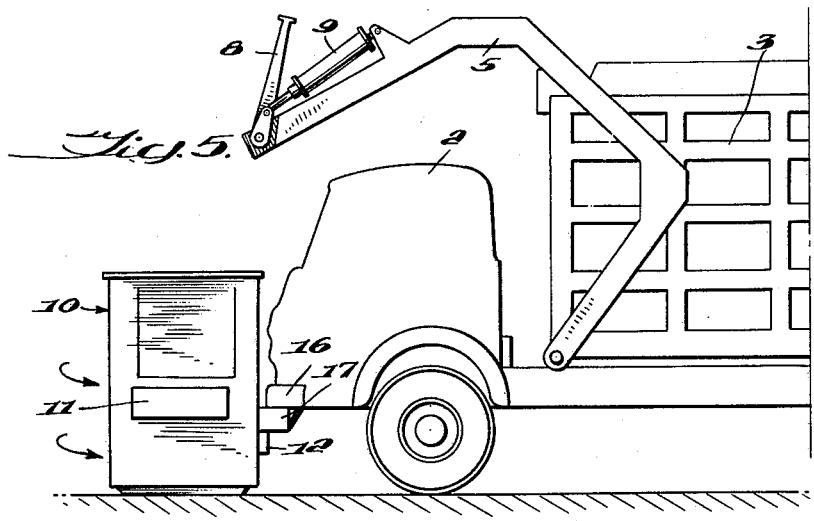
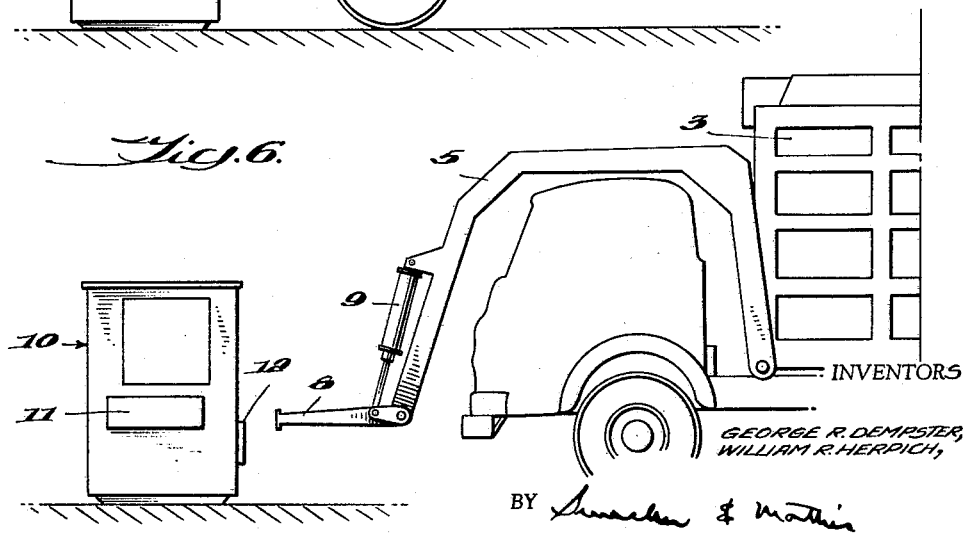

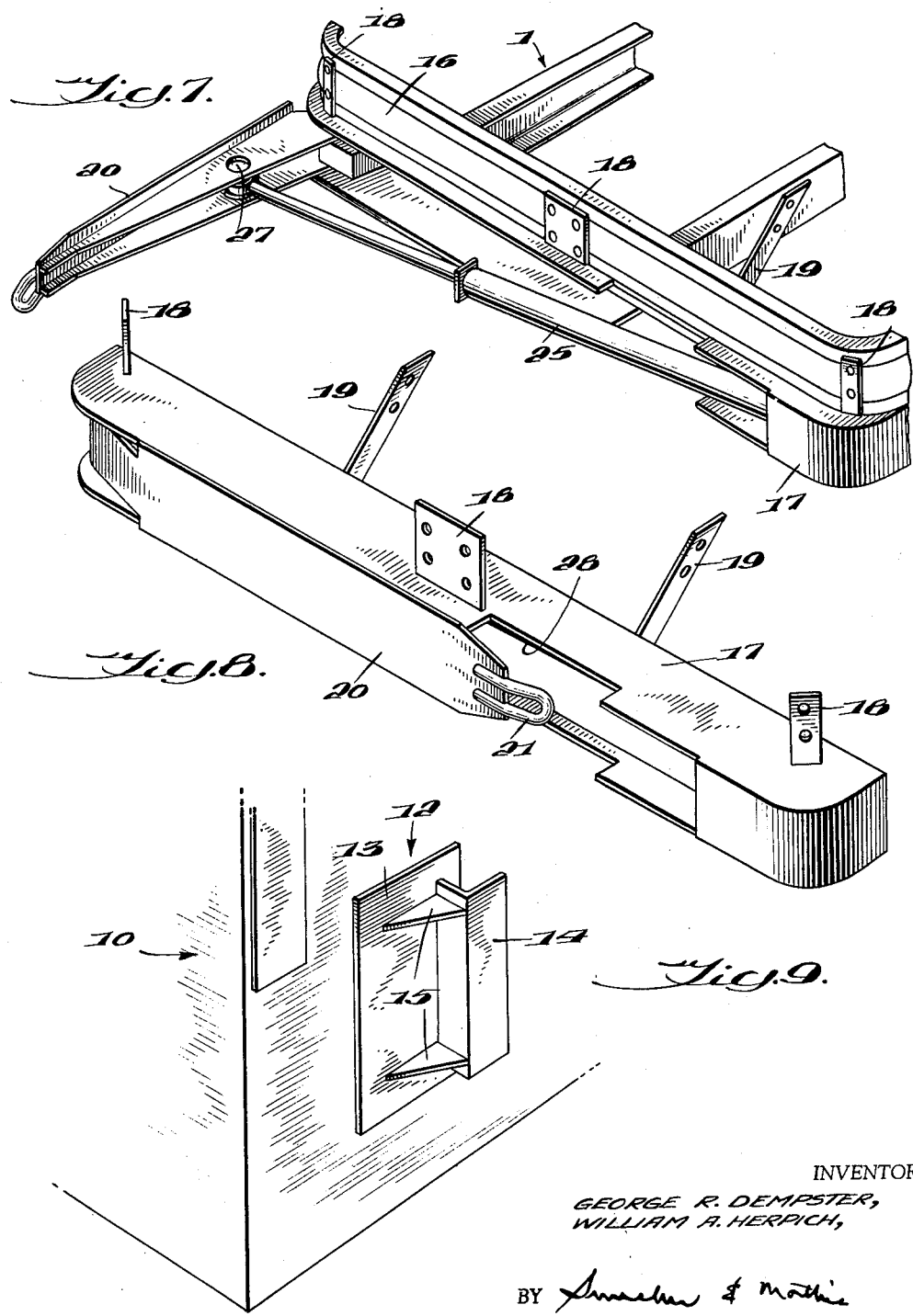

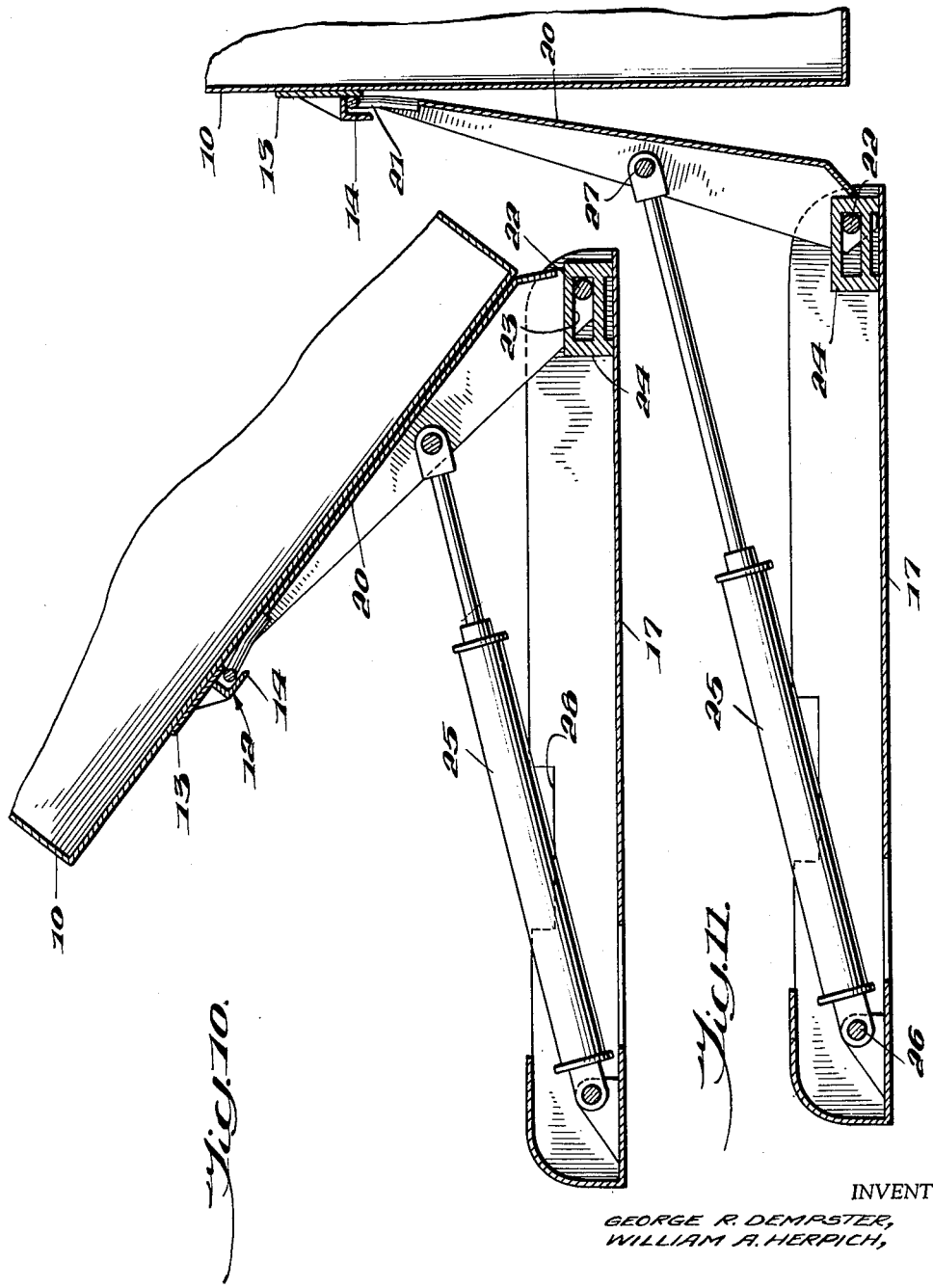

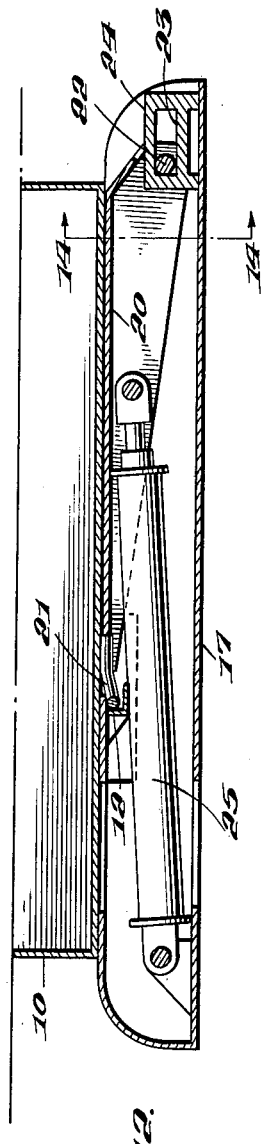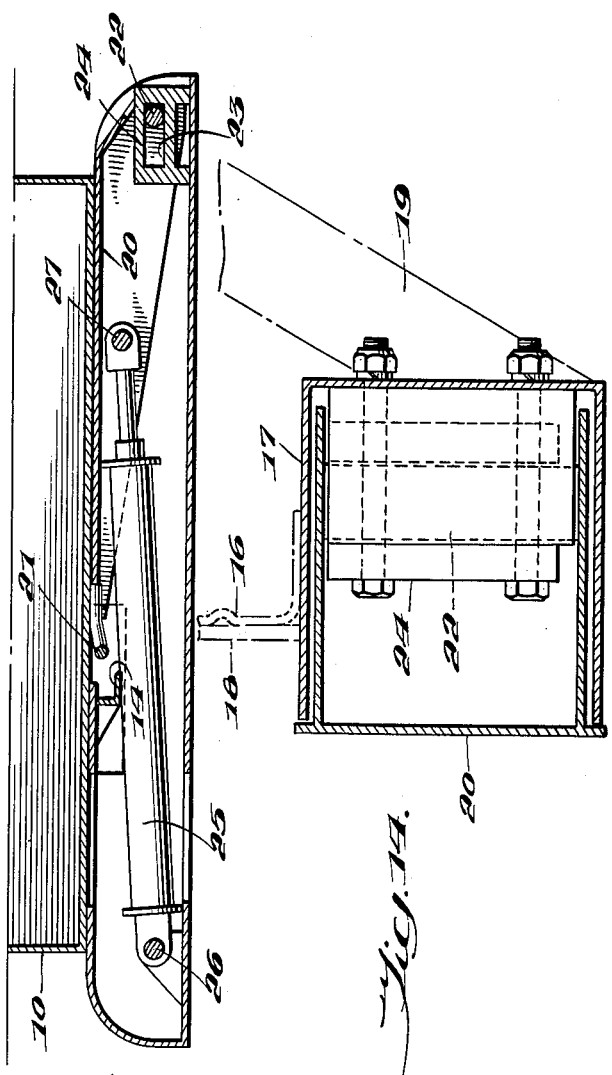

3,085,703
FRONT END LOADER EQUIPMENT
George R. Dempster and William A. Herpich, Knoxville, Tenn.; said Herpich assignor to Dempster Brothers, Inc., Knoxville, Tenn., a corporation of Tennessee
Filed Dec. 7, 1959, Ser. No. 857,819
7 Claims. (Cl. 214—302)

This invention relates to improvements in front end loader equipment and, more particularly, to the type used for dumping refuse from separate containers into the body of a motor vehicle.

As set forth in our prior patent, No. 2,900,096, granted August 18, 1959, front end loader equipment, for picking up a container at the front of the vehicle, was designed for the direct approach to the detachable container, in order that fork extensions on the hoisting unit may engage sleeves on the end walls of the container, so as to lift the container to a dumping position. It is often desirable that the container be so disposed in its separate refuse receiving position that the truck mounted hoisting unit cannot align itself for direct approach with the container. This is true especially when the container may be located in a narrow alley or where the movement of the vehicle to the container is limited by congested traffic or other conditions. In such instances, it is often desirable that the vehicle approach the container at a right angle or other angular position with respect to the normal pick-up side of the container.

One object of this invention is to provide for the shifting or rotation of the container with respect to the vehicle into a position where the hoisting means can engage the container in normal manner for lifting the container to a dumping position.

Another object of the invention is to provide for shifting movement of the container by power actuated under the control of the operator of the equipment located in the cab of the vehicle, to shift the container to a normal pick-up position by the front end loader mechanism.

Still another object of the invention is to simplify and improve mechanism located on the vehicle carrying the front end loader equipment for the shifting or turning of the container to a pick-up position with respect to the vehicle before engagement of the container by the loading equipment.

These objects may be accomplished, according to one embodiment of the invention, by providing a reach arm on the vehicle which may be operated in synchronism with the front end loader equipment and under the control of the operator thereof. This arm engages with the container, in the event that the latter is turned to an angular relation out of its normal pick-up position and thereby shift the container with respect to the vehicle and into proper alignment with the front end loader equipment.

A connector bracket mounted on a side of the container other than the ends where the front end loader would engage the container, is in such position as to be engaged by a reach arm operated mechanically under the control of the operator in the cab of the truck to shift the container by power into its proper pick-up position. The reach arm may be manipulated by a hydraulic cylinder or other suitable means. It is preferred that the reach arm be located on the front portion of the truck. The reach arm is mounted in a convenient position at the front of the truck as, for example, on the bumper, and operates in proper relation to the actuation of the lifting mechanism.

This embodiment of the invention is illustrated in the accompanying drawings, in which:

FIG. 1 is a perspective view, showing front end loader equipment and a container in their relation to each other;

FIG. 2 is a side elevation thereof, with the lifting arms raised out of the path of the container and with the vehicle approaching the container;

FIG. 3 is a similar view, showing the engagement of the reach arm with the container;

FIG. 4 is a similar view, showing the container partially turned relative to the vehicle;

FIG. 5 is a similar view, showing the container fully turned to its pick-up relation to the vehicle;

FIG. 6 is a similar view, showing the loader mechanism in position for engaging the container;

FIG. 7 is a perspective view of the reach arm assembly, with the arm in container engaging position;

FIG. 8 is a similar view, with the reach arm folded;

FIG. 9 is a detail perspective view, showing the reach arm engaging bracket on the container;

FIG. 10 is a horizontal sectional view through the reach arm assembly and a portion of the container in partially turned position;

FIG. 11 is a similar view, showing the reach arm in engaging position with the container;

FIG. 12 is a similar view, showing the reach arm in folded relation;

FIG. 13 is a similar view, showing the disengagement of the reach arm with respect to the container; and FIG. 14 is a cross section therethrough, on the line 14—14 in FIG. 12.

The invention is shown as applied to front end loader mechanism of the character set forth in our prior patent, No. 2,900,096, granted August 18, 1959. It is capable of use, however, with other types of front end loader mechanism, but should be operated in synchronism therewith.

In the form shown in FIGS. 1 to 6, a motor vehicle chassis is designated generally by the numeral 1. The chassis 1 is power operated under the control of the operator, who is usually located within a cab 2, for controlling the movements of the vehicle and of the loader mechanism. A refuse body is shown at 3, mounted on the vehicle chassis 1 and having a hopper or opening 4 in the top thereof for the dumping of the refuse into the body.

The loader mechanism includes a pair of lifting arms 5 mounted on a torque tube 6 at the rear of the cab 2 for swinging movement to different angular positions with respect to the body 3, as illustrated, for example, in FIGS. 1 to 6. The lifting arms 5 may be operated by any suitable power means, such as power cylinder 7, connected therewith.

Mounted on the front end portions of the lifting arms 5 are fork arms 8 capable of vertical swinging movements with respect to the lifting arms 5 under control of hydraulic power devices 9 that are connected therewith. The operation and function of these parts is described more fully in our aforesaid patent, No. 2,900,096.

A container is designated generally at 10. The container 10 is adapted to receive refuse and to confine the latter, having surrounding walls and a closed bottom and may be closed by lids at the top. Any suitable or desired form of container may be used, capable of being handled and dumped by the loader mechanism.

The container 10 is provided with sleeves 11 on opposite ends thereof in proper positions for horizontal alignment with the fork arms 8 when the lifting arms 5 are lowered to their normal pick-up positions, as illustrated in FIG. 6. The sleeves 11 are open at opposite ends, in order that the fork arms 8 may extend entirely through the sleeves and securely engage the container thereby, for lifting and dumping the container.

Mounted on a side wall of the container intermediate the sleeves 11, is a connector bracket 12, shown more in detail in FIG. 9. The bracket 12 comprises a mounting plate 13 welded or otherwise secured directly to one of the side walls of the container. An angular member 14 is secured to and extends outwardly from the mounting plate 13, so as to provide a shoulder or recess on said side wall of the container.

Gussets 16 are interposed between the angle bar 14 and the mounting plate 13, to brace and secure the angle bar. These parts may be welded or otherwise secured together.

The vertical chassis is provided with the usual chassis frame, which is shown in FIG. 7, and this chassis frame usually has a front bumper connected rigidly thereto, as illustrated at 16 in FIGS. 1 to 7. The bumper 16 is shown as a convenient means of mounting the reach arm assembly, although it will be appreciated that the latter may be mounted on any other suitable or available portion of the vehicle.

In the embodiment illustrated, the reach arm assembly comprises an elongated housing, generally indicated at 17, which extends lengthwise of the bumper 16 and is shown as directly beneath the latter. The housing 17 is preferably constructed of box shape, suitably braced and reinforced, and to provide a desirable appearance in conformity with the portion of the vehicle to which it is attached. The housing 17 in this embodiment is connected by mounting pads 18 with the bumper 16 through suitable fastening means, such as welding, rivets, bolts, etc. Mounting bars 19 also extend from the housing 17 to the frame of the chassis 1, as illustrated in FIGS. 7 and 8. The diagonal position of the mounting bars 19 securely brace the reach arm assembly and aid materially in holding it in place.

The reach arm is shown generally at 20 and should be constructed relatively light in weight, but of sturdy structure, so as to effect the proper movement of the container under the control of the operator. The outer end of the reach arm 20 is shown as having a connecting finger 21 projecting therefrom in position to engage in the overhanging shoulder member 14 of the connector bracket 12 for shifting the container.

As shown in FIGS. 10 to 14, the reach arm 20 is mounted on a journal pin 22 which extends transversely through an elongated slot 23 and is connected at its opposite ends with the opposite sides of the reach arm 20. The slot 23 is provided within a bracket 24 secured within the housing 17 at one end of the latter. The pin and slot 22—23 form a slidable pivot for the reach arm 20, which enables the reach arm to swing outwardly relative to the bumper 16 and also to shift lengthwise.

The movement of the reach arm 20 is effected by a hydraulic cylinder 25 pivotally mounted at one end at 26 on the housing 17 within the closed end of the latter and extending therefrom to a pivot 27 on an intermediate portion of the reach arm 20. Thus, upon expanding or contracting movement of the cylinder 25, the reach arm 20 is extended or retracted, as illustrated in the several positions shown in FIGS. 10 to 13.

This reach arm assembly is adapted to be used as a part of front end loader mechanism for picking up and dumping containers in locations where the container normally stands in an inaccessible position out of direct alignment for access thereto by the vehicle. For example, in localities such as congested traffic or narrow alleys, there may be insufficient area available for the truck mounted dumping unit to align itself for direct approach to the container. In that event, the vehicle may approach in the direction of the length of the container, as shown in FIG. 1, at a right angle to the normal approach side of the container. This requires that the container be turned through approximately 90° to permit engagement of the front end loader mechanism for lifting and dumping the container.

The lifting arms 5 are initially raised to a position out of the way of the container, as illustrated in FIG. 2. Then, the vehicle is moved forward in such relation that the reach arm 20 will engage with the connector bracket 12, as shown in FIG. 3. As soon as the finger 21 on the reach arm 20 has engaged behind the angle bar 14 of the bracket 12, the container 10 can be turned from the angular position shown in FIGS. 2 and 3 to a position where it will be disposed directly in front of the vehicle, as shown in FIGS. 5 and 6. This is accomplished by operation of the hydraulic cylinder 25, the contracting movement of which swings the reach arm 20 from the position shown in FIG. 11 successively to the positions shown in FIGS. 10 and 12. This actuation of the reach arm 20 moves the container 10 bodily on the ground with respect to the vehicle and slides it into abutting relation with the front portion of the vehicle against the forward faces of the reach arm 20 and of the housing 17 and properly centered with respect to the vehicle chassis.

The initial closing movement of the reach arm 20 pulls the bracket 12 into the confines of the housing 17. A notch 28 is provided in the front portion of the housing 17 to accommodate and receive the bracket 12 during this closing movement, as will be apparent from FIGS. 12 and 13.

Thereafter, the finger 21 can be disengaged from the bracket 12 by a short extending movement of the cylinder 25 sufficient to slide the pivot pin 22 to the opposite end of the slot 23 from the position shown in FIG. 12 to the position shown in FIG. 13. The reach arm is then disengaged from the container and the vehicle may be backed off away from the latter, as shown in FIG. 6, so as to move the lifting arms 5 and fork arms 8 into pick-up relation with the container. After such movement, the vehicle can be moved forward again to engage the fork arms 8 in the sleeves 11 for moving the container vertically to dump the contents therefrom into the hopper or opening 4 of the body 3. Thereafter, the container can be set down on the ground by the lifting arms 5 and fork arms 8.

If it be desirable to return the container 10 to the side position illustrated in FIG. 1, this may be accomplished by reversing the operation of the reach arm 20, as described above. Upon swinging movement of the reach arm 20 by the cylinder 25 in an outward direction, as illustrated in FIGS. 10 and 11, respectively, the container can be moved bodily to a displaced position with respect to the front of the vehicle.

During this action, it is preferred that the lifting arms 5 be raised, so as to avoid interference with the container 10, or at least that the fork arms 8 be moved upward with respect to the lifting arms, as illustrated in FIG. 5.

While the invention has been illustrated and described in one embodiment, it is recognized that variations and changes may be made therein without departing from the invention as set forth in the claims.

We claim:
1. In a front end loader mechanism of the character described, the combination with a motor vehicle chassis adapted to be disposed adjacent a container at one side of the front end portion of the chassis, of means on the chassis for moving the container bodily transversely of the chassis to a position directly in alignment therewith, said means comprising a reach arm pivotally mounted on the vehicle at one side thereof in position for swinging movement transversely of the vehicle, power means connected with the arm for moving the latter, and means for connecting the reach arm with the container for moving the container bodily transversely of the vehicle substantially to an aligned relation therewith, the pivot means for the arm including a slot extending transversely of the vehicle chassis and a journal pin on the reach arm extending into the slot whereby the connecting means is selectively disengaged from the container after movement of the container to said aligned relation with the vehicle.

2. Mechanism on a vehicle chassis for engaging and bodily moving a container relative to the vehicle chassis, comprising a base extending across the chassis, means forming a slot in the base, a reach arm, means for mounting one end of the reach arm in the slot whereby the reach arm swings relative to the base and is movable longitudinally along the base, said reach arm having a portion for engaging a container when the reach arm is swung away from the base, and means for swinging the reach arm to a position adjacent the base and for moving the reach arm in the slot to disengage the reach arm from the container.

3. Mechanism on a vehicle chassis for engaging and bodily moving a container relative to the vehicle chassis, comprising a base extending across the chassis, means forming a slot extending longitudinally in the base, a reach arm, a journal pin extending through one end of the reach arm and in the slot, said reach arm having a portion for engaging a container when the reach arm is swung away from the base, and means for swinging the reach arm to a position adjacent the base whereby the journal pin is shifted to one end of the slot and for shifting the journal pin to the opposite end of the slot to disengage the reach arm from the container.

4. Mechanism on a vehicle chassis for engaging and bodily moving a container relative to the vehicle chassis, comprising a base extending across the chassis, means forming a slot adjacent one end of the base and extending longitudinally in the base, a reach arm, said reach arm having a portion to engage a container for bodily movement of the container relative to the base, a journal pin extending through one end of the reach arm and through the slot, and an expansible hydraulic cylinder extending between the base and the reach arm and arranged to move selectively the journal pin in the slot to engage and disengage the reach arm from the container and to swing the reach arm relative to the base.

5. Mechanism on a vehicle chassis for engaging and bodily moving a container relative to the vehicle chassis, comprising a base extending across the chassis, means forming a slot adjacent one end of the base and extending longitudinally in the base, a reach arm, a journal pin extending through one end of the reach arm and through the slot whereby the reach arm swings on the journal pin relative to the base and the journal pin is movable longitudinally of the base in the slot, an expansible hydraulic cylinder having one end attached to the base at the opposite end of the base from the slot, the other end of the cylinder being connected to the reach arm and means on the reach arm for engaging a container when the reach arm is swung away from said base, said cylinder being arranged to retract the reach arm sequentially to a position adjacent the base and to move the journal pin from one end of the slot to the other to disengage the reach arm from the container.

6. In front end loader mechanism for picking up and dumping material from a container into the body of a motor vehicle, the combination with a motor vehicle, and a loading mechanism mounted on said motor vehicle, said loading mechanims having engaging means at the front of the vehicle for picking up the container and moving the container to an elevated dumping position, of a reach arm, hinge means mounting the reach arm on the vehicle at one side thereof for swinging the reach arm outwardly and inwardly relative to the vehicle, power means for swinging the reach arm and the container bodily transversely relative to the vehicle to a position substantially in alignment with the engaging means, and means in the hinge means cooperating with the power means for disengaging said reach arm from the container after movement of the container to said aligned position.

7. Mechanism for moving a container into alignment with a vehicle comprising, in combination with the vehicle, and container engaging means thereon, of a reach arm having one end mounted on the vehicle at one side thereof, hinge means at one end of the reach arm for swinging of the reach arm outwardly and inwardly relative to the vehicle, a container having a side wall, a bracket on the side wall in position to be engaged by the opposite end of the reach arm, power means for swinging the reach arm in engagement with the container bodily transversely relative to the vehicle chassis to a position of the container substantially in alignment with the engaging means in the hinge means for engagement thereby, and means cooperating with the power means for disengaging said reach arm from the bracket after movement of the container to said aligned position.

References Cited in the file of this patent

UNITED STATES PATENTS

| | | |
|---|---|---|
| 2,189,052 | Anthony | Feb. 6, 1940 |
| 2,271,624 | Cochran | Feb. 3, 1942 |
| 2,706,062 | Turner et al. | Apr. 12, 1955 |
| 2,799,418 | Haldimann | July 16, 1957 |
| 2,900,096 | Dempster et al. | Aug. 19, 1959 |
| 2,951,602 | Walden et al. | Sept. 6, 1960 |
| 2,016,157 | Brisson | Jan. 9, 1962 |